April 30, 1940.  F. FERRIN  2,199,257
COMBINED HARVESTING AND LOADING MACHINE
Filed Dec. 27, 1938   4 Sheets-Sheet 1

Inventor
Frank Ferrin
By
Kilgore & Kilgore
Attorneys

April 30, 1940.   F. FERRIN   2,199,257
COMBINED HARVESTING AND LOADING MACHINE
Filed Dec. 27, 1938   4 Sheets-Sheet 2

Inventor
By Frank Ferrin
Kilgore & Kilgore
Attorneys

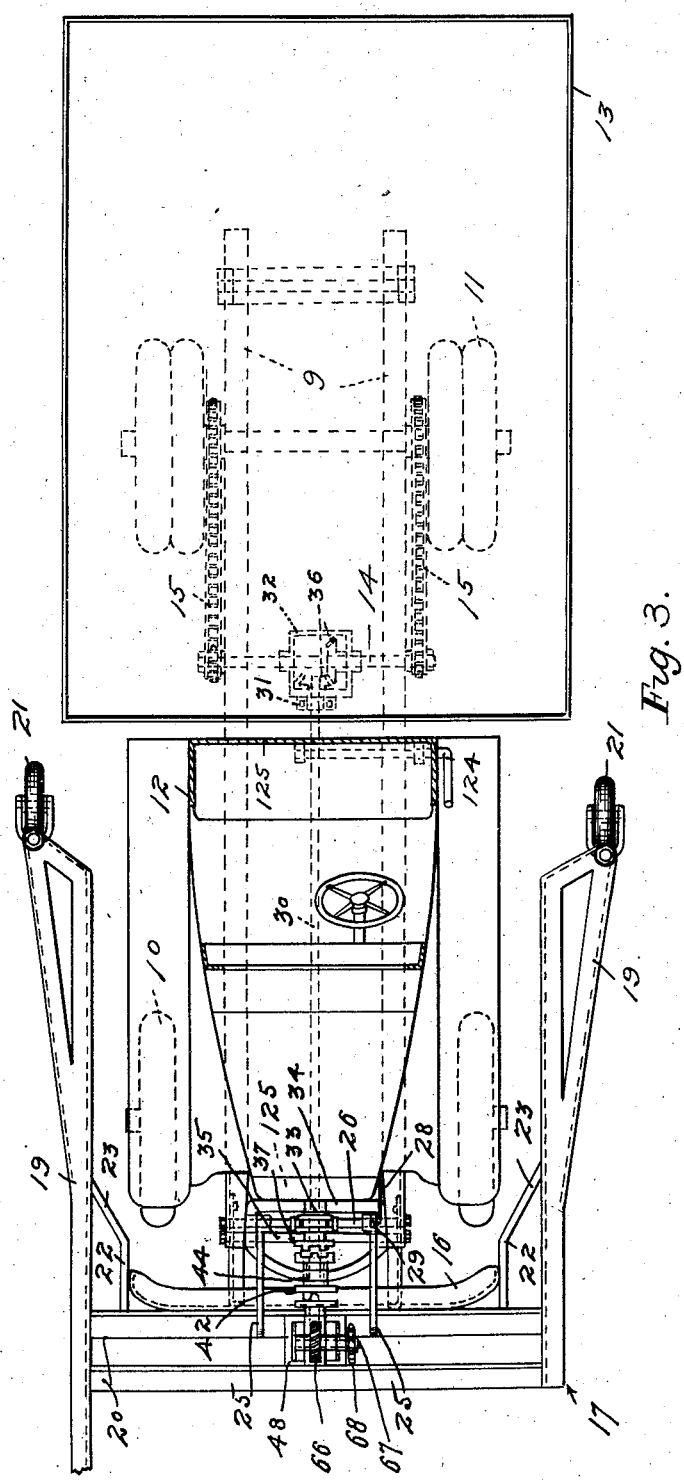

April 30, 1940.  F. FERRIN  2,199,257
COMBINED HARVESTING AND LOADING MACHINE
Filed Dec. 27, 1938    4 Sheets-Sheet 4
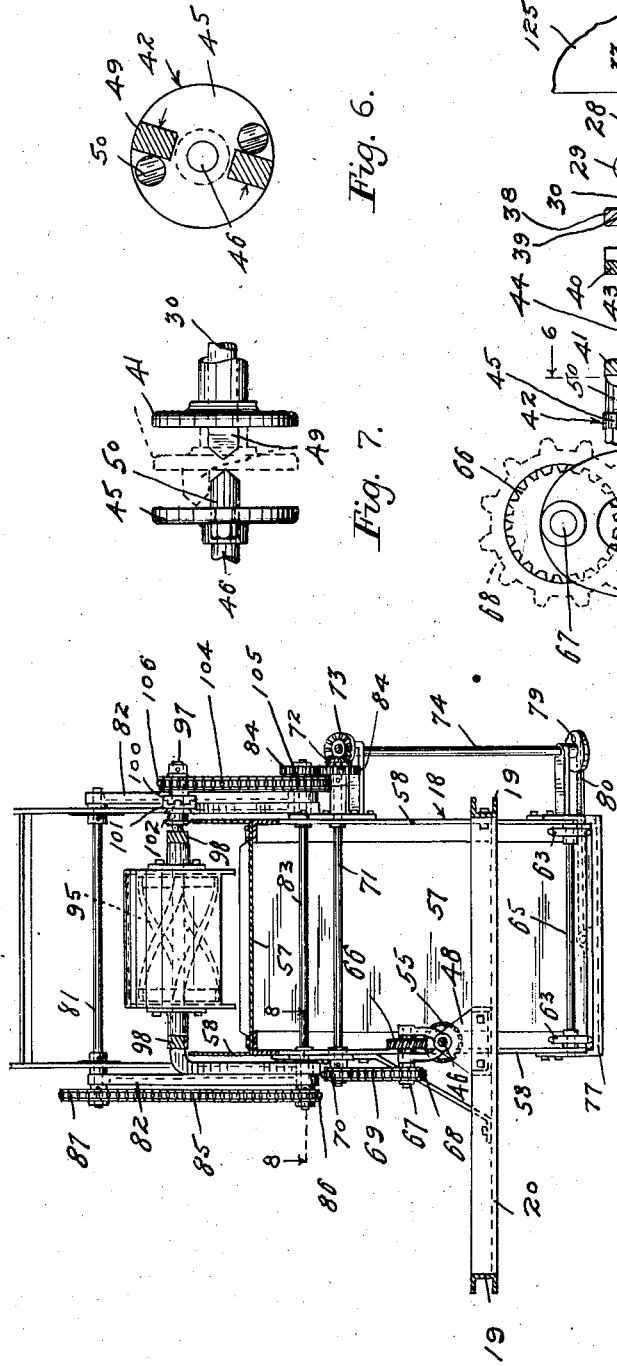
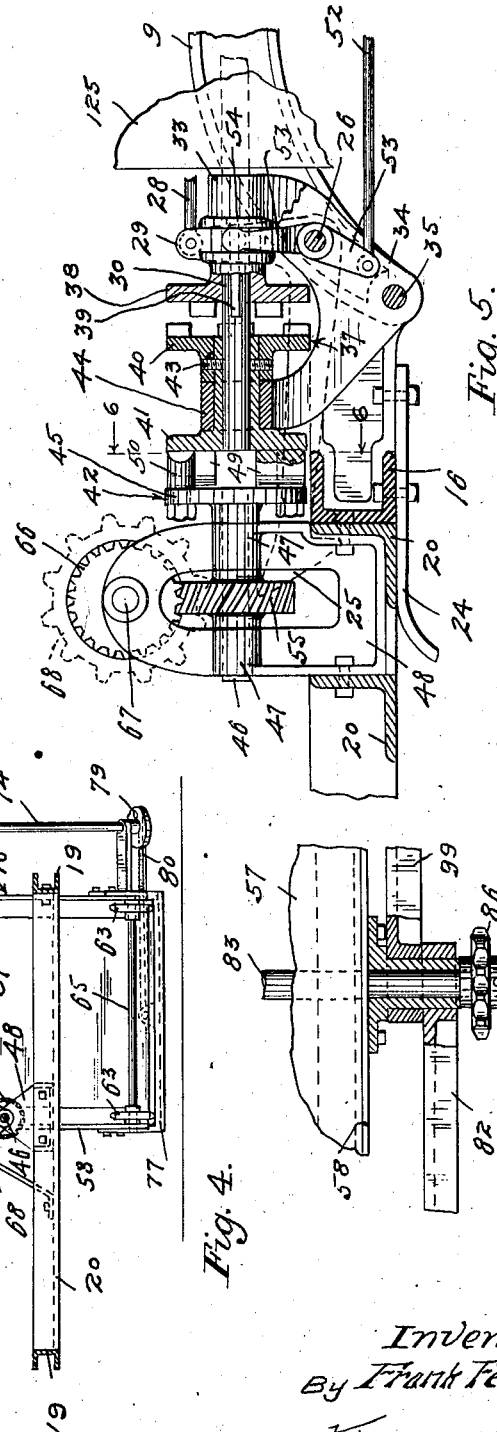
Inventor
By Frank Ferrin
Kilgore and Kilgore
Attorneys Patented Apr. 30, 1940

2,199,257

UNITED STATES PATENT OFFICE 2,199,257

COMBINED HARVESTING AND LOADING MACHINE

Frank Ferrin, Minneapolis, Minn.

Application December 27, 1938, Serial No. 247,763

7 Claims. (Cl. 214—83)

My present invention has for its object to provide a combined harvester and loader designed as an attachment for an automotive truck and with driving connections for operating the movable parts thereof from the engine of said truck. While this machine is intended for general use on a farm as a labor saving machine in cutting and loading materials, it is especially intended for use in cutting corn stalks in the field, directing the stalks as they are cut, onto an elevator, in cutting said stalks into short pieces by an ensilage cutter during the upward travel on said elevator and which elevator discharges the cut pieces from the ensilage cutter into the dump pieces of the truck. When the body of the truck is filled with the cut corn stalks, the same is driven to a silo where the same is dumped and stored therein.

To the above end, generally stated, the invention consists of the novel devices and combinations of devices, hereinafter described and defined in the claims.

In the accompanying drawings, which illustrate the invention, like characters indicate like parts throughout the several views.

Referring to the drawings:

Fig. 3 is a plan view of the invention as shown in Fig. 1, some parts being removed, other parts being broken away, and still other parts being shown by means of broken lines;

Fig. 4 is a view partly in elevation and partly in section taken on the line 4—4 of Fig. 2;

Fig. 5 is a fragmentary detail view on an enlarged scale, partly in section and partly in elevation showing the connections between the truck and the invention;

Fig. 6 is a detail view with some parts sectioned on the line 6—6 of Fig. 5;

Fig. 7 is an elevation of the coupling as shown in Fig. 5 except that the members thereof are separated, one of said members being shown in a different position by means of broken lines; and Fig. 8 is a fragmentary detail view with some parts sectioned on the line 8—8 of Fig. 4.

Figure 1:
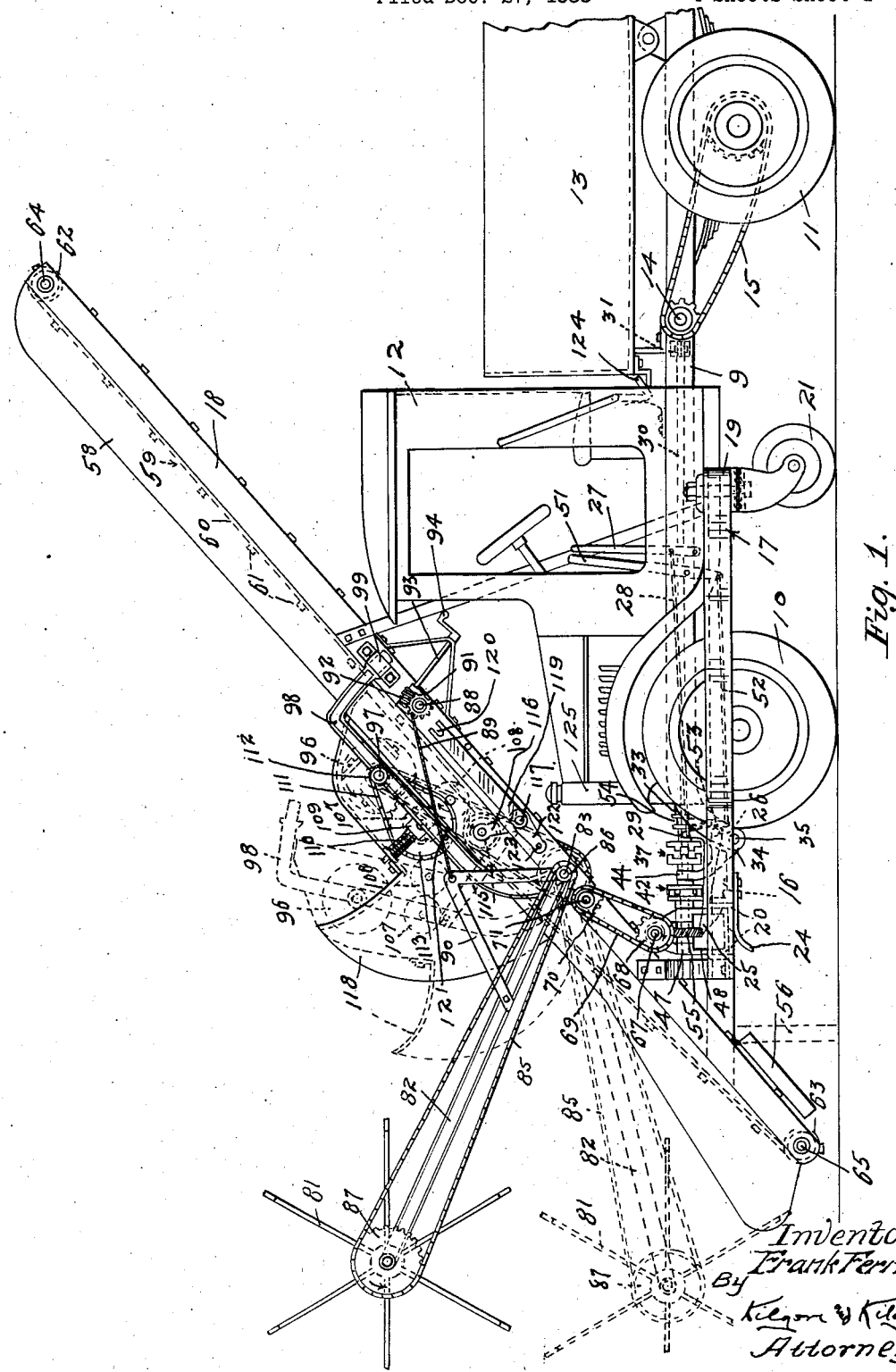
Fig. 1 is a fragmentary view in side elevation showing the invention mounted on an automotive truck with some parts shown by means of broken lines.

The invention is shown as an attachment to an automotive truck and is mounted thereon and of the parts thereof, illustrated, it is important to note; the longitudinal frame members 9, the front and rear wheels 10 and 11 respectively, the cab 12, the dumping body 13, the transverse shaft 14, driven from the engine of the truck, driving connections 15 from said shaft to the rear wheels 11 and the front bumper 16 mounted on, and rigidly secured to the front end portions of the frame members 9.

Referring now in detail to the invention, the same includes a horizontal main frame 17 and an upwardly and rearwardly inclined elevator frame 18. Said main frame 17 includes a pair of rearwardly projecting side members 19 and two laterally spaced cross-tie members 20. Caster wheels 21 are secured to the rear end portions of the frame side members 19 and support the same. The front end portion of the truck extends between the frame side members 19 with its bumper 16 directly engaging the rear cross-tie member 20. Stop members 22 secured in the corners of the main frame 17, formed by the frame side members 17 and the rear cross-tie member 20, engage the ends of the bumper 16 and hold the main frame centered relative to the truck. The rear end portions of the stop members 22 are outwardly and rearwardly inclined as indicated at 23, to direct the bumper 16 between said members.

The front end portion of the main frame 17 is loosely supported from the bumper 16 by a pair of forwardly projecting short tongues 24 rigidly secured to the under side of said bumper. Only one of these tongues 24 is shown and the front end portion is curved downwardly to direct the same under the rear cross-tie member 20 during the coupling of the truck to the frame 17.

The main frame 17 is releasably coupled to the truck by a pair of laterally spaced hooks 25 pivoted to a transverse rock shaft 26 mounted on the side members of the frame 9. These coupling hooks 25 project forwardly over the bumper 16 and interlock with the rear cross-tie bar 20. The front end portion of the coupling hooks 25 are upwardly and forwardly curved so that during the coupling of the truck to the main frame 17 said hooks upon engaging the rear cross-tie member 20 will ride over said member and then drop by gravity into interlocking engagement therewith. To release the coupling hooks 25 from the rear cross-tie member 20, there is mounted in the cab 12 a hand lever 27 connected by a long link 28 to an upwardly projecting lug 29 on the rear end portion of one of said hooks.

Referring again to the truck it is not thought necessary to show its engine or the driving connections therefrom except the drive shaft 30. This shaft 30 is journaled at its rear end in a bearing 31 on a housing 32 carried by the shaft 14, and its front end portion is journaled in a bearing 33 on the rear arm of a U shaped bracket 34 mounted on a cross-tie rod 35, between the frame members 9 and is a part of the truck structure. The shaft 14 is driven from the shaft 30 by a pair of beveled gears 36.

An ensilage cutter, an elevator, a reel and other parts associated therewith, are mounted on the elevator frame 18 and all thereof driven from the shaft 30 as will hereinafter appear.

A clutch 37 on the front end portion of the shaft 30, between the arms of the bracket 34, includes a rear member 38 mounted for axial sliding movement on said shaft but held for rotation therewith by a key 39. The front member 40 of the clutch 37 is telescoped onto the rear end portions of the hub of the rear member 41 of a separable coupling 42 and secured for common rotation therewith by screws 43. Said hub of the coupling member 41 is journaled in a bearing 44 on the front arm of the bracket 34 and the front end portion of the shaft 30 is journaled in said hub. The bearing 44 which fits between the hub of the clutch member 40 and the back of the coupling member 41 holds said clutch coupling member against axial movement. The other, or front member 45 of the coupling 42 is rigidly secured to the rear end of a short shaft 46 axially aligned with the shaft 30 and journaled in a pair of bearings 47 on a bracket bearing 48 that is rigidly secured to and between the two cross-tie members 20. On the opposing faces of the coupling members 41 and 45 are cooperating driving lugs 49 and 50 respectively. The driving lugs 49, as shown, are oblong in cross-section to afford relatively wide bearing surfaces for the driving lugs 50 which are round in cross-section. The purpose of making the driving lugs 49 wider than the driving lugs 50 is to prevent said lugs from passing each other during relative movements of the truck and the main frame 17. To permit the lugs 49 to pass the lugs 50, in case they are axially aligned during movement of the coupling member 41 to an operative position, the free end portions of said lugs are beveled, see Fig. 7.

The movable clutch member 38 is moved to or from an operative position by a hand lever 51 mounted in the cab 12 and connected by a long link 52 to a shipper lever 53 on the shaft 26 and having a cooperating shipper collar 54 on the hub of said clutch member.

A driving gear 55 on the shaft 46 is fixed for rotation therewith between the two bearings 46.

To support the front end of the main frame 17 when uncoupled from the truck, the same is provided with a pair of pivoted legs 56. Any suitable means, not shown, may be provided for holding the legs 56 raised when the main frame 17 is coupled to the truck.

In actual construction of the combined harvester and loader, connections for raising the legs 56 may be provided and extended to the cab 12.

Referring now to the elevator frame 18, the same is provided with a deck 57 and side members 58. A belt-like elevator 59 is mounted on the elevator frame 18 and comprises a pair of link belts 60 and cross slats 61 secured to said belts. The belts 60 are arranged to run over upper and lower pairs of sprocket wheels 62 and 63 respectively. The upper sprocket wheels 62 are mounted on a shaft 64 journaled in bearings on the upper end portions of the elevator frame 18 and the sprocket wheels 63 are mounted on a shaft 65 journaled in a bearing on the lower end portions of said side members. These sprocket wheels 62 and 63 are arranged with the upper run of the elevator 59 on the upper side of the deck 57 and the return or lower run of said elevator on the under side of said deck. By reference to Fig. 1 it will be noted that the elevator frame 18 supports the elevator 59 with its lower or receiving end close to the ground, forward of the truck and with its delivery or upper end over the truck body 13.

The shaft 65 is driven from the gear 55 by the following connections, to wit: a gear 66 meshing with said gear 55 is mounted on a short shaft 67 journaled in the bearing bracket 48 and has on its outer end a sprocket wheel 68. A sprocket chain 69 runs over the sprocket wheel 68 and a sprocket wheel 70 on one end of a transverse shaft 71 journaled in bearings on the side members of the elevator frame 18.

On the other end of the shaft 71 is a bevel gear 72 which meshes with a bevel gear 73 on the intermediate portion of a long shaft 74 which extends parallel to the elevator frame 18 and is journaled in bearings on the respective side member of said frame. A bevel gear 75 on the upper end of the shaft 74 meshes with a bevel gear on the upper shaft 64 and completes the driving connections from the gear 55 to the shaft 64 for moving the elevator 59 in a direction which in its upper run, moves upwardly over the deck 57.

Mounted on the lower end of the elevator frame 18 is a cutting device for corn or other materials having a serrated cutter bar 78 that is reciprocated transversely of the elevator frame 18 by an eccentric 79 on the lower end of the shaft 74 and connected by a link 80 to said cutter bar.

A reel 81 is provided for directing corn or other materials to be cut by the cutting device 77 onto the elevator 59. The shaft for the reel 81 is journaled on the outer end portions of a pair of swingable arms 82 pivoted at their inner ends on the hubs of bearings for a transverse shaft. See Fig. 8. The bearings for the shaft 83 are on the side members of the elevator frame 18 just above the shaft 71. The shaft 83 is driven from the shaft 71 by a pair of intermeshing spur gears 84 on the right hand ends of said shafts. The reel 81 is rotated in the direction of the arrow marked thereon in Fig. 1 by a sprocket chain 85 which runs over a small sprocket wheel 86, on the left hand end of the shaft 83 and a large sprocket wheel 87 on the shaft of said reel.

For raising or lowering the reel 81 and holding the same in either an operative position as shown by broken lines in Fig. 1, or in an inoperative position, as shown by full lines in said figure, I provide a windlass shaft 88 mounted on the left hand side of the elevator frame 18 and a cable 89, one end portion of which is wound on said shaft. The other end of the cable 89 is attached to an upstanding bracket 90 on the respective reel arms 82.

For rotating the windlass shaft 88 or for holding the same against rotation there is mounted on the outer ends of said shaft a worm gear 91 and meshing therewith is a worm 92. This worm 91 is mounted on a crank shaft 93 journaled in bearings on the respective side of the elevator frame 18 and having on its outer end a hand crank 94 that may be reached by an operator in the cab 12.

Figure 2:
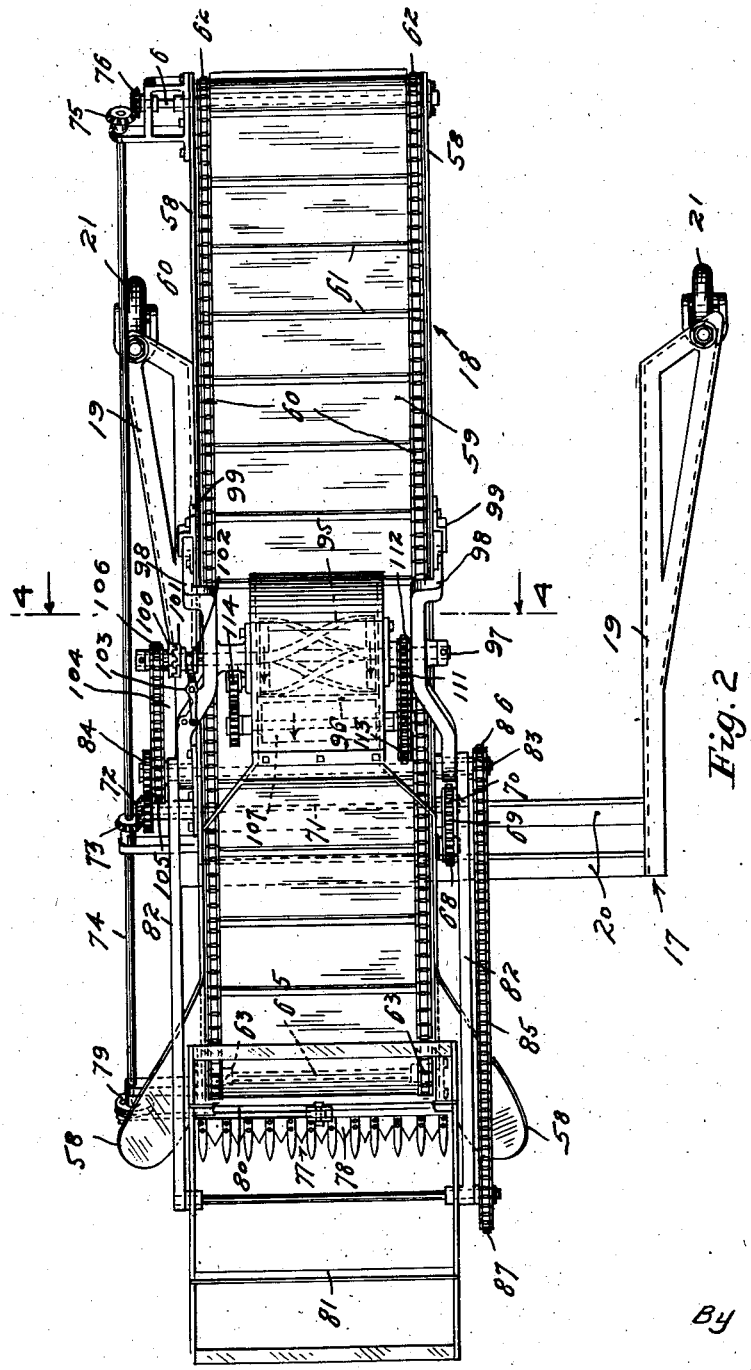
Fig. 2 is a plan view of the invention removed from the truck.

During the upward travel of the cut corn stalks on the elevator 59 and when they reach substantially the longitudinal center of the elevator frame 18 they are cut into short pieces by a rotary ensilage cutter 95 having a plurality of spiral knife blades and a cooperating fixed cutter blade 96. The shaft 97 for the cutter 95 is journaled in bearings on a pair of swingable arms 98 at the intermediate portions thereof. The arms 98, at their inner or lower ends, are pivoted on the same bearing hubs for the arms 82, see Fig. 8, for swinging movement about the axis of the shaft 83. Said arms 98, at their outer or upper ends, loosely rest in pockets 99 on the side members of the elevator frame 18. By reference to Fig. 1, it will be noted that the intermediate portions of the arms 98 are upwardly off-set and support the cutting device 95 considerably above the deck 57. Mounted on the shaft 97 is a clutch that is mounted on the right hand end portion of the shaft 97 and includes a loose member 100 and a cooperating fixed member 101 having a shipper collar 102. A shipper lever 103 is intermediately pivoted to the right hand arm 98 and one of its arms extends into the shipper collar 102. When the clutch member 101 is released, the outer arm of the shipper lever 103 is secured to the respective arm 98 by a pin, not shown, that is insertable through aligned holes in said outer shipper lever arm and the arm 98, see Fig. 2. The loose clutch member 100 is driven from the shaft 86 by a sprocket chain 104 which runs over a large sprocket wheel 105 on the right hand end of the shaft 86 and over a small sprocket wheel 106 on said clutch member.

Cut corn stalks on the elevator 59 are fed to the ensilage cutter 95 by upper and lower feed rolls 107 and 108 respectively. The shaft of the lower feed roll 108 is journaled in bearings on the arms 98 and the shaft of the upper feed roll 107 is journaled in floating bearings 109 that are yieldingly pressed toward the shaft of the lower feed roll 108 by coiled springs 110. The upper feed roll 107 is driven from the shaft of the ensilage cutter 95 by a sprocket chain 111 which runs over a small sprocket 112 on the left hand end portion of the shaft of said cutter and a large sprocket wheel 113 on the shaft of said upper feed roll. A pair of intermeshing spur gears 114 drive the lower feed roll 108 from the upper feed roll 107.

The elevator 59 runs over an idle roll 115 journaled on the free ends of a pair of bearing arms 116 fixed to a shaft 117 journaled in bearings on the side members of the elevator frame 18. This idle roll 115 is positioned just below the lower feed roll 108 and holds the respective position of the elevator 59 passing thereover raised and directs the corn stalks on said elevator between the feed rolls 108 and 109. From the idle roll 115 the elevator 59 is passed under the lower feed roll 108 and is held depressed thereby and spaced below the ensilage cutter 95 so that the corn stalks, after being cut, by said cutter, drop onto said elevator and freely pass under said cutter.

A housing 118 for the ensilage cutter 95 and feed rolls 107 and 108 is mounted on the arms 98.

When the elevator 59 is to be used without the ensilage cutter 95, the arms 98 are raised with all parts carried thereby into a position as shown by broken lines in Fig. 1. In this position of the arms 98 the same are supported by a leg 119 pivoted at one end to the left hand side member of the elevator frame 18, and formed in the free or other end of said leg is a notch 120 arranged to receive a pin 121 on the overlying arm 98.

The idle roll 115 is held in an operative position by a fixed arm 122 on the shaft that may be releasably secured to the respective side member of the elevator frame 18 by a pin 123. When the ensilage cutter 95 is in an inoperative position as shown by broken lines in Fig. 1, the pin 123 will be withdrawn to release the arm 122 and allow the idle roll 115 to rest on the deck 59 permitting straight line travel of the elevator 59 from one end of the elevator frame 18 to the other.

A lever actuated latch is provided for holding the body 13 against dumping movement and indicated by the numeral 124 and the radiator of said truck is indicated by the numeral 125.

Obviously, the reel 81 tips the standing corn stalks toward the machine during the forward travel of the machine and as the same is cut, drops longitudinally onto the elevator 59 in overlapping rows that extend transversely of said elevator. It will be seen that an even layer of corn stalks is constantly passing between the feed rolls 107 and 108, from one end thereof to the other and is fed thereby in the same manner to the ensilage cutter 95 so that there is a continuous cutting action by the knives on substantially a constant thickness of corn stalks without undue strain on the ensilage cutter 95. From the ensilage cutter 95 the cut pieces of corn stalks drop onto the elevator 59, are elevated thereby to the top of the elevator frame 18, where they drop into the truck body 13.

When the truck body 13 is full of cut corn stalks, the lever 51 is operated to move the clutch member 40 into an inoperative position and thereby stop operation of the moving parts carried by the elevator frame 18. Said truck is then driven to the silo and its load dumped therefrom where the same is elevated into said silo.

When the elevator 59 is used for elevating purposes only, the arms 82 and 98 are raised and thereby position the reel 81, ensilage cutter 95 and all other parts carried by said arms into an inoperative position.

To detach the combined harvester and loader from the truck it is only necessary to lower the legs 56, operate the hand lever 27, to release the coupling hook 25, then to back the truck away from said combined harvester and loader. Obviously a larger amount of labor is saved by the use of my combined harvester and loader over the present method of harvesting corn, cutting the same for ensilage and storing the cut corn in a silo. Furthermore, the use of expensive bindery twine is eliminated.

By feeding corn stalks to an ensilage cutter in a thin layer, as is done in my combined harvester and loader, in place of feeding bundles of corn stalks held together by binding twine, as is now the general practice, less power is required to drive the ensilage cutter and less strain is placed on the cutting mechanism.

The elevator 59 is laterally offset on the elevator frame 18 to the right so as not to obstruct the view of an operator of the machine when sitting in the cab 12.

It will be understood that the invention is capable of various modifications, all within the scope of the invention disclosed, and broadly claimed.

What I claim is:

1. In a machine of the kind described, a horizontally disposed U shaped main frame having caster wheels on the free end portions of its arms, an upwardly and rearwardly inclined elevator frame mounted on the front end of the main frame, an endless belt-like elevator mounted on the elevator frame, means for mounting the transverse portion of the main frame on the front end of an automotive truck with the arms of said main frame extending rearwardly, one on each side of the truck, driven connections on the frames for operating the elevator including one member of a separable coupling for connecting said driven connections to the driving connection of the truck, and displaceable supporting legs on the front end portion of the main frame.

2. The combination with an automotive truck having a front bumper and also having driven connections including a clutch extending from its driving connections, of a horizontally disposed U shaped main frame, caster wheels on the free end portions of its arms, an upwardly and rearwardly inclined elevator frame mounted on the front end of the main frame, an endless belt-like elevator mounted on the elevator frame, means on the bumper for releasably supporting the transverse portion of the main frame thereon, with the arms of the main frame extending rearwardly one on each side of the truck, a separable coupling connecting the main frame to the truck, driving connections on the main and elevator frames for operating the elevator, and a separable coupling for connecting the driving connections on said two frames to the driven connections on the truck.

3. The structure defined in claim 2 which further includes a pair of displaceable legs on the front end portion of the main frame for supporting the same when it is removed from the truck.

4. In a device of the kind described, a horizontally disposed U-shaped main frame, caster wheels on the arms of the main frame, an upwardly and rearwardly inclined elevator frame on the main frame, an endless belt-like elevator mounted on the elevator frame, the arms of the main frame being substantially parallel and laterally spaced to receive the front end portion of a truck therebetween and under the elevator frame and with its front end closely positioned to the transverse member of the main frame, a separable coupling for connecting the main frame to the truck, driving connections on the main frame and the elevator frame for operating the elevator, and a separable coupling for connecting the driving connections on said two frames to the driving connections of the truck.

5. The structure defined in claim 4 in which the elevator frame is laterally offset to one side of the main frame and thereby leaves an unobstructed view over the transverse member of the main frame at the other side of said main frame.

6. The structure defined in claim 4 which further includes means on the main frame for centering the truck between the arms of the main frame.

7. The structure defined in claim 4 which further includes members in the corners of the main frame constructed and arranged to be engaged by the ends of the bumper on the truck and center the truck between the arms of the main frame.

FRANK FERRIN.